United States Patent

Graeme

[11] Patent Number: 6,104,033
[45] Date of Patent: Aug. 15, 2000

[54] METHOD OF DETERMINING FLUID LEVEL AND INTERFACE IN A CLOSED VESSEL

[75] Inventor: Wm Scott Graeme, Hoffman Estates, Ill.

[73] Assignee: UOP LLC, Des Plaines, Ill.

[21] Appl. No.: 09/094,872

[22] Filed: Jun. 15, 1998

[51] Int. Cl.[7] .................................................. G01F 23/288
[52] U.S. Cl. ................ 250/357.1; 250/258; 250/339.12; 73/36; 378/52; 600/407
[58] Field of Search ................................. 250/357.1, 258, 250/267, 308, 432 R; 378/52, 206; 324/469, 96; 73/36, 61.41, 440, 861.04; 600/407, 427, 430

[56] References Cited

U.S. PATENT DOCUMENTS

| | | | |
|---|---|---|---|
| 2,714,167 | 7/1955 | Herzog . | |
| 3,170,064 | 2/1965 | Martin . | |
| 3,486,374 | 12/1969 | Wright | 250/357.1 |
| 3,654,458 | 4/1972 | Burrus et al. . | |
| 3,668,392 | 6/1972 | Bajek et al. . | |
| 4,038,548 | 7/1977 | Charlton . | |
| 4,228,353 | 10/1980 | Johnson . | |
| 4,369,368 | 1/1983 | Bernard et al. | 250/357.1 |
| 4,471,223 | 9/1984 | Hurst et al. . | |
| 4,904,878 | 2/1990 | Gipp et al. . | |
| 5,509,460 | 4/1996 | Chun et al. . | |
| 5,596,196 | 1/1997 | Cooper et al. | 250/339.12 |

FOREIGN PATENT DOCUMENTS 0 330 123
A2-A3   8/1989   European Pat. Off. .

*Primary Examiner*—Constantine Hannaher
*Assistant Examiner*—Otilia Gabor
*Attorney, Agent, or Firm*—John G. Tolomei; Frank S. Molinaro; Maryann Maas

[57] ABSTRACT

A process and apparatus for determining the levels in a vessel of two or more immiscible or partially-miscible components has been developed. The process begins with transmitting gamma rays, x-rays, microwaves, ultrasound waves, or sonar waves through the vessel by sequentially activating at least three stationary energy sources positioned adjacent to and in the vertical plane of the vessel. A set of intensities of the energy exiting the vessel corresponding to each energy source is measured using an array of stationary sensors where each set contains the intensity sensed by each sensor in the array of sensors. The sensors of the array are positioned in the vertical plane of the vessel and in alignment with the energy penetrating the vessel. The array of sensors contains a number of sensors that is at least one greater than the number of energy sources. The sets of intensities sensed by the array are recorded and an algorithm selected from the group consisting of partial least squares with latent variables, multiple linear regression, principal component regression, and neural networks is applied to the aggregate of the recorded sets to determine the levels of the components.

13 Claims, 3 Drawing Sheets

METHOD OF DETERMINING FLUID LEVEL AND INTERFACE IN A CLOSED VESSEL

FIELD OF THE INVENTION

The invention is a process and apparatus for determining the level of the interface of two or more immiscible for partly-miscible fluids within a closed vessel.

BACKGROUND OF THE INVENTION

The invention relates to a method of determining the level of the interface of two or more immiscible or partly-miscible fluids within a closed vessel. The level of any emulsion formed by the fluids may also be determined. In general, three or more stationary energy sources are positioned adjacent to the vessel, and stationary energy sensors are positioned to detect the level of intensity of energy exiting the vessel. Each energy source is sequentially activated and a set of intensities for each energy source is detected by the array of sensors and recorded. The aggregate of the sets of intensities is analyzed using an algorithm to determine the fluid levels. The method is based on the principle that materials of different densities often possess different energy adsorption coefficients. With the path length of the system being held constant, the degree of adsorption is correlatable with the density of the medium penetrated. Systems to detect the levels of fluid within a closed vessel are known in the art, but the method described herein provides an increased level of accuracy with greater ease of operation and maintenance.

Several systems described in the art require that the energy source be movable; see U.S. Pat. Nos. 3,668,392, 2,714,167, and 5,509,460. In some cases, a single sensor is moved in tandem with the movement of the energy source. Although successful, equipping the systems with the apparatus necessary for the precise movements of the energy source and maintaining that apparatus may be costly.

Other systems have provided multiple stationary energy sources each with its own individual corresponding sensor or array of sensors; see U.S. Pat. Nos. 4,228,353, 4,471,223, 4,038,548 and 3,170,064. U.S. Pat. No. 4,471,223 also discloses a single radiation source and an array of sensors. Another approach has been to insert the energy source and a detector, or source-sensor pairs, invasively into the vessel such as described in U.S. Pat. Nos. 3,654,458 and 4,904,878. Still another approach has been to use an energy source an sensor attached to a vertical standpipe in fluid communication with the vessel containing the fluids whose interface level is to be determined such as described in EP 330 123-A2. The standpipe is positioned so that the interface levels in the standpipe correspond to the same levels as those in the vessel.

The present invention provides a method of determining the level of fluid interface within a closed vessel that is noninvasive, has low maintenance, is accurate and cost effective. Furthermore, the necessary apparatus is easy to install on existing vessels thereby making retrofit applications economically attractive. The method of the present invention provides greater detail and accuracy than those previously available by analyzing an aggregate of recorded sets of data where each data set contains intensity measurements corresponding to different energy sources.

SUMMARY OF THE INVENTION

Figure 1:
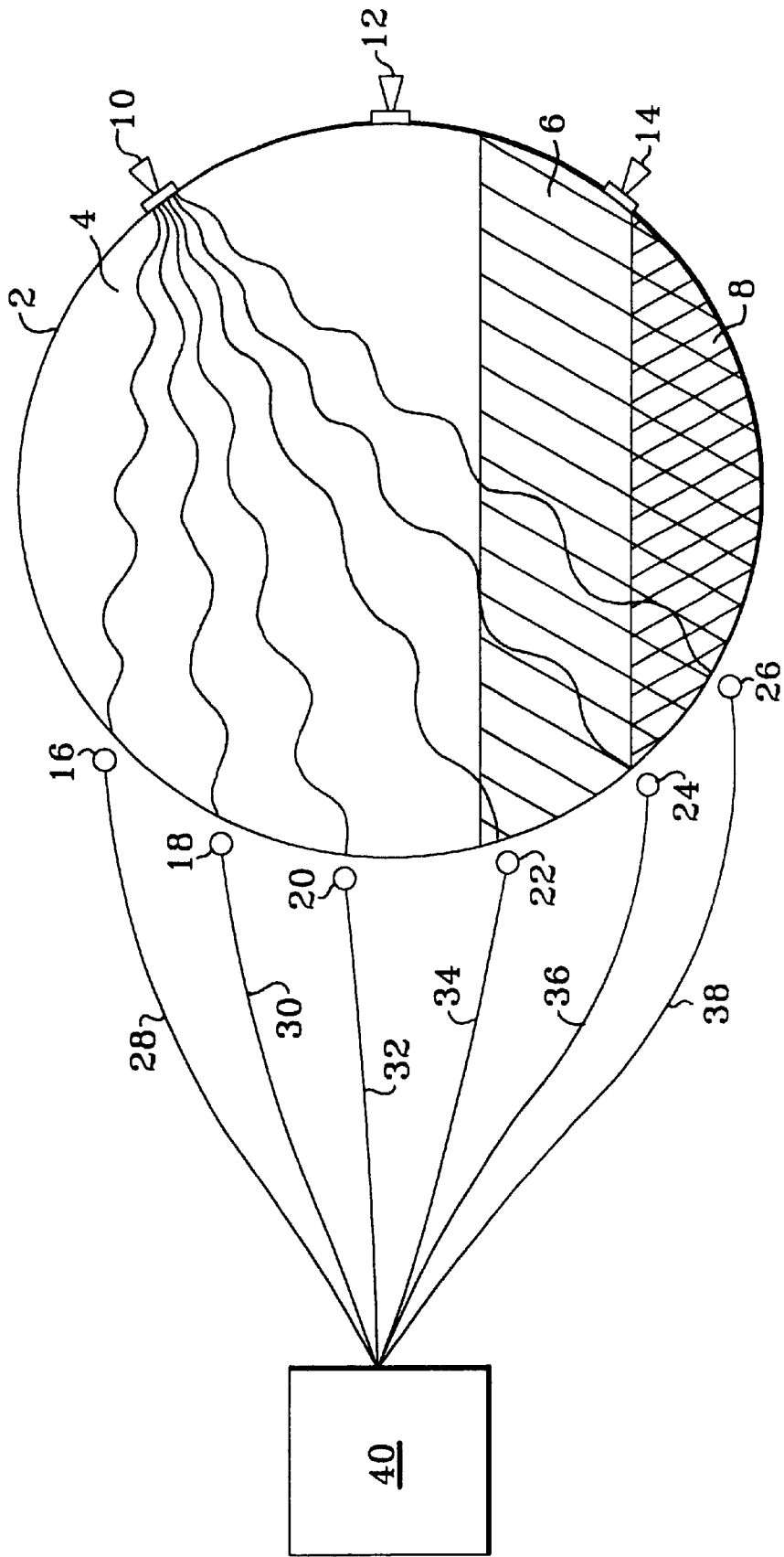
FIGS. 1, 2, and 3 are schematic representations of the apparatus used in the present invention. Each of FIGS. 1, 2, and 3 show the same apparatus but with different energy sources activated. The drawings have been simplified by the deletion of a large number of pieces of apparatus customarily employed in methods of this nature which are not specifically required to illustrate the performance of the invention.

The purpose of the invention is to provide a process for determining the levels in a vessel of two or more immiscible or partially-miscible components having different densities and any emulsion of the components. The method begins with transmitting gamma rays, x-rays, microwaves, ultrasound waves, or sonar waves, termed herein generally as "energy", through the vessel by sequentially activating at least three stationary energy sources positioned adjacent to and in the vertical plane of the vessel. A set of intensities of the energy exiting the vessel corresponding to each energy source is measured using an array of stationary sensors where each set contains the intensity sensed by each sensor in the array of sensors. The sensors of the array are positioned in the vertical plane of the vessel and in alignment with the energy penetrating the vessel. The array of sensors contain a number of sensors that is at least one greater than the number of energy sources. The sets of intensities sensed by the array are recorded and an algorithm selected from the group consisting of partial least squares with latent variables, multiple linear regression, principal component regression, and neural networks is applied to the aggregate of the recorded sets to determine the levels of the components.

DETAILED DESCRIPTION OF THE INVENTION

In general terms the invention is a process for determining the levels within a vessel of two or more immiscible or partly miscible components having different densities and emulsions thereof if present. At least three stationary energy sources are positioned adjacent to and in the vertical plane of the vessel. An array of stationary sensors are positioned adjacent to the vessel, in the vertical plane of the vessel, and in alignment with the energy sources. The array of sensors contains a number of sensors that is a least one greater than the number of energy sources. Sequentially, each energy source is activated and energy is transmitted from the source through the vessel and its contents, and the intensity of the energy exiting the vessel is measured by way of the energy impinging on the array of sensors. Because the energy sources and the sensors are stationary, the path length between each source and each sensor remains constant. The aggregate of the measurements recorded for each energy source is analyzed using an algorithm and the level of the components and any emulsion thereof is determined.

The vessel containing the components may be of a variety of types of vessels, and most likely will be a storage tank, liquid-liquid separator, or vapor-liquid separator. The vessel is typically cylindrical, and may be in a horizontal or vertical orientation. The material of construction and the external wall thickness should be considered along with the selection of electromagnetic or acoustic energy to be used so that the transmitted energy will not be unduly attenuated. Because the components of the invention are preferably external to the vessel, the invention is particularly suited to those circumstances where it is undesirable to invade the vessel. For example, in a hydrofluoric acid alkylation process the containment of process fluids is important, and a noninvasive method for determining the levels of hydrocarbon, hydrofluoric acid, and an emulsion thereof is much preferred. Another benefit of the invention is that the apparatus necessary to perform the invention is easily installed externally to the vessel. Retrofitting existing vessels with the required apparatus is therefore easily accomplished and maintenance may be performed without upsetting or disturbing the vessel.

At least three stationary sources of energy are positioned externally but adjacent to the vessel and in the vertical plane of the vessel. A variety of energy sources may be used including those that generate electromagnetic radiation and acoustic energy. Suitable electromagnetic radiation includes x-rays, gamma-rays, and microwaves and suitable acoustic energy includes those in the wavelengths of ultrasound and sonar. These types of energy are well known and will not be discussed in detail here. For reference, see *Ullmann's Encyclopedia of Industrial Chemistry* $5^{th}$ Edition Elvers, B.; Hawkins, S.; Schultz, G.; Hofmann, H., Eds.; VCH Publishing Group: New York, Vol. B1, p. 11-3–11-27; and *Encyclopedia of Physical Science and Technology* Meyers, R. Ed.; Academic Press: New York, Vol. 14 pp. 191–209 and Vol. 1 pp. 183–190 and 653–656. The most preferred are the electromagnetic radiation sources generating x-rays or gamma-rays. The preferred sources of x-rays include tubes having targets of tungsten, copper, iron, or cobalt and the preferred sources of gamma-rays include radioisotopes such as cesium-137 and cobalt-60. Ultraviolet radiation, visible radiation, infrared radiation, near infrared radiation, and far infrared radiation, which are types of energy that are insufficient to penetrate the vessel and its contents are not suitable for use in the invention. It is also important that a means of controlling the transmittance of the energy be present. As discussed below, the energy sources are used sequentially and only one is in use at a time. Therefore, means to activate or deactivate must be present. Depending upon the nature of the energy being used the means may be the presence or absence of shielding.

An array of stationary sensors are positioned so as to be in alignment with the energy exiting the vessel. Most likely the array of sensors will be positioned on the opposite side of the vessel from the energy sources. Like the energy sources, it is preferred that the sensors making up the array are positioned externally but adjacent to the vessel. Optionally, the sensors may be positioned within a well extending within the vessel, however this is less preferred. The array of sensors is further positioned in the vertical plane of the vessel. The minimum number of sensors in the array is one greater than the number of energy sources used. The individual sensors of the array may be spaced out along the vessel or may be grouped together in particular areas of interest. The sensors may also be clustered into groups where the groups are spaced out along the vessel. The sensors are chosen so as to be compatible with the type of energy used and capable of measuring the intensity of the transmitted energy. Commonly used sensors are known in the art and are discussed in *Ullmann's Encyclopedia of Industrial Chemistry* $5^{th}$ Edition Elvers, B.; Hawkins, S.; Schultz, G.; Hofmann, H., Eds.; VCH Publishing Group: New York, Vol. B1, p. 11-3–11-27; and *Encyclopedia of Physical Science and Technology* Meyers, R. Ed.; Academic Press: New York, Vol. 14 pp. 191–209 and Vol. 1 pp. 183–190 and 653–656. Each sensor in the array of sensors is connected to a microprocessor for the collection, recording, and analysis of the measurements. Because both the energy sources and the sensors are stationary, the path length between each source and each sensor is held constant.

The above-described apparatus is used to determine the level of two or more immiscible or partly-miscible components of different densities in a vessel. The components may be two or more liquids, which may form an emulsion, or a liquid and a gas. One common example includes an aqueous component and an organic component. Another particular example is a settler in a hydrofluoric acid alkylation process where the two components are hydrofluoric acid and a hydrocarbon which also form an emulsion. The components are present in the vessel equipped with the above-described apparatus. It is possible for the system to be calibrated by filling the vessel full of the least dense component to establish the maximum intensity possible at each sensor, but calibration is not necessary since over time the amount of energy expected to penetrate the different components will become apparent.

The method of the present invention begins with the activation of the first energy source. The term "activate" or "activation" is used herein to describe the state of the energy source where the energy is emitted from the source and transmitted through the vessel and its contents. For example, in the case of a radioisotope radiation source, the source may be activated by the removal of shielding. The energy emitted from the first energy source is transmitted through the vessel and its contents. The intensity of the energy exiting the vessel is sensed simultaneously by each of the sensors in the array. The intensity of the energy sensed at each sensor will vary depending upon which component(s) the energy was required to penetrate in order to reach a particular sensor of the array. The greatest intensity will be sensed where the energy was required to penetrate only the least dense component and the least intensity will be sensed where the energy was required to penetrate only the most dense component. The intensities will vary between these extremes depending upon the sequential permeation of the components or emulsion. The relation between intensity and average density along a path length is well known; see U.S. Pat. No. 5,509,460, incorporated herein by reference, for further discussion. The intensities sensed by each of the sensors of the array are recorded by a microprocessor and the first energy source is deactivated. The second energy source is then activated, and again the intensity of the energy exiting the vessel is sensed by each sensor of the array and recorded by the microprocessor. The second energy source is deactivated, and a third energy source is activated, with each sensor of the array sensing the energy exiting the vessel which is recorded by the microprocessor. The process continues for a full cycle, i.e., a set of intensities has been recorded corresponding to each of the energy sources. Depending upon the type of sensors used, there may be a pause between the sequential activation of the energy sources to allow the sensors to return to sensing only background levels of energy.

The aggregate of the intensities over a full cycle is analyzed in the microprocessor using an algorithm that relates the intensities sensed to the average density of the components penetrated along the path length of the energy. Such determinations are known in the art, as are several mathematical algorithms for analyzing the data including, but not limited to, partial least squares with latent variables, multiple linear regression, principal component regression, and neural networks. The complete process may be repeated to continually monitor the levels of the components within the vessel. In fact, the process may be repeated as often as about every minute to give virtually a real time monitoring of the levels of the components within the vessel. Alternatively, after a full cycle is complete, only one of the energy sources can be reactivated and one set of new intensity measurements sensed and recorded. The algorithm may be applied to the aggregate of the one new set of intensities and the previously measured sets of intensities for the energy sources that were not reactivated, and the process may continue in this manner.

Without intending any limitation on the scope of the present invention, and as merely illustrative, this invention is explained below in specific terms as applied to one embodiment of determining the levels of hydrofluoric acid, hydrocarbon, and emulsion within a settler. The necessary apparatus is first described, and then process of the invention as applied to the embodiment is discussed. For ease of understanding, the process of the invention is described below using only three energy sources and an array of six sensors.

Figure 2:
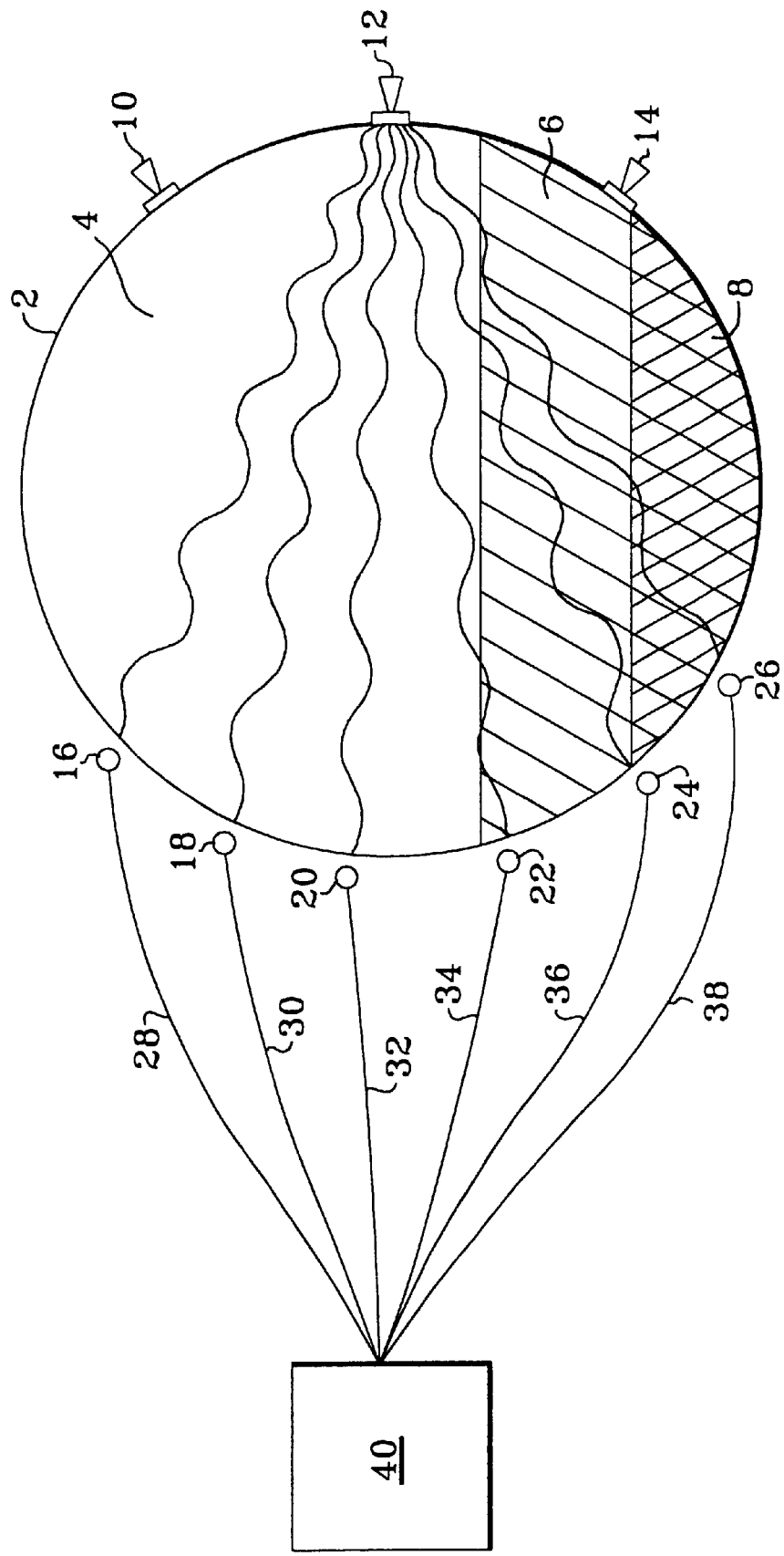
Figure 3:
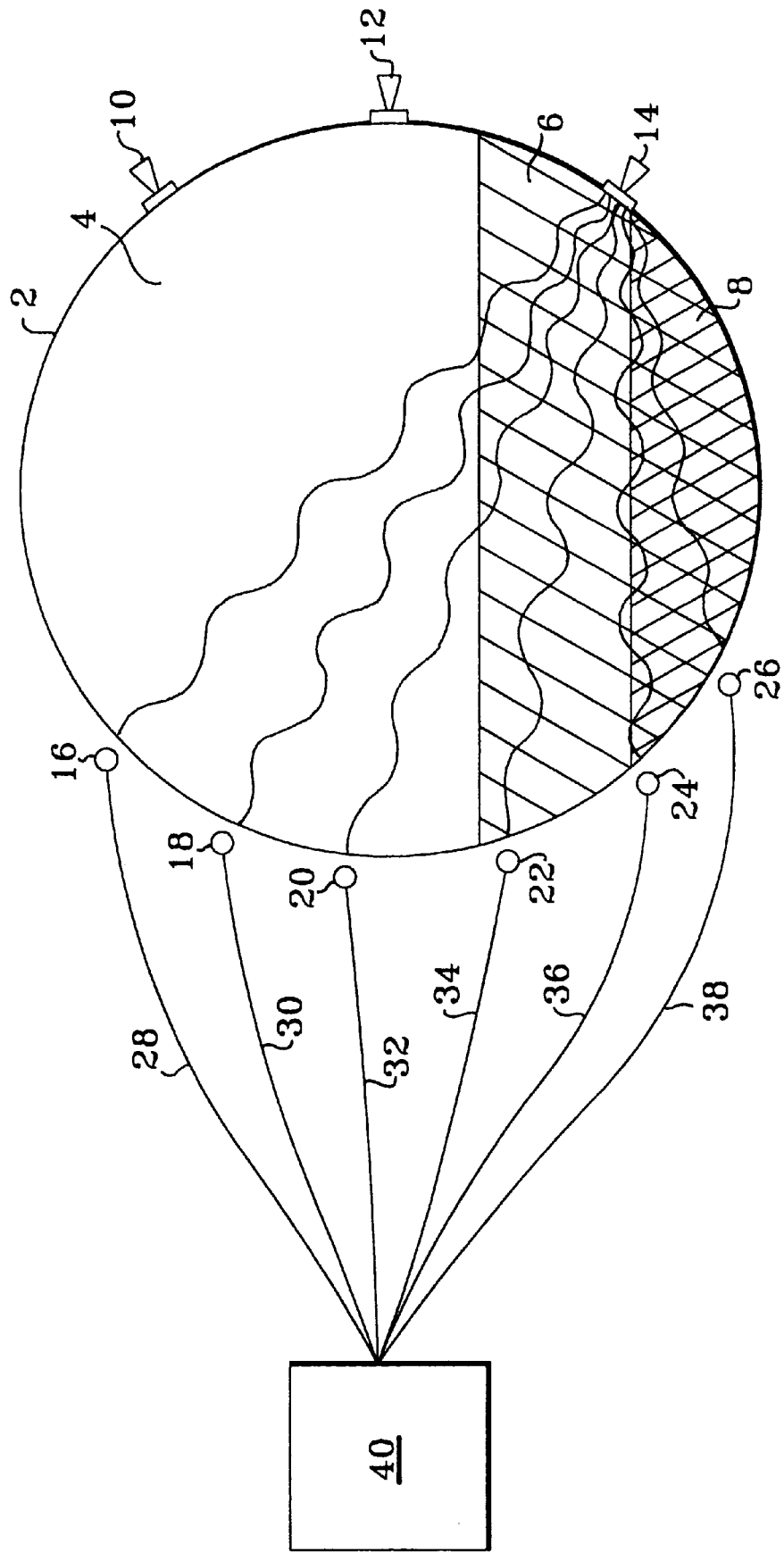

Turning now to the apparatus as illustrated in FIGS. 1–3, vessel 2, an elongated cylindrical vessel serving as a gravity-type acid settler, contains hydrocarbon 4, hydrofluoric acid 8 and an emulsion 6 thereof. Three energy sources, 10, 12, and 14, are stationarily affixed to the external wall of vessel 2 in the vertical plane of vessel 2. The energy sources each provide about the same strength of electromagnetic radiation in the form of gamma-rays from cesium-137. Each energy source is equipped with shielding (not shown) which may be employed to prevent gamma-rays emitted by a particular source from transmitting through the vessel. An array of six stationary sensors 16–26 that are capable of detecting the gamma-rays emitted by the sources, are affixed to the external wall of vessel 2 in the vertical plane of vessel 2 and opposite energy sources 10–14. Each sensor 16–26 is provided with a corresponding conduit 28–38 for the transmission of data to a microprocessor 40.

The method begins with the activation of energy source 10 as shown in FIG. 1. The gamma-rays radiate outward from source 10 and penetrate through the vessel and its contents. The intensity of the gamma-rays exiting the vessel is measured by the six sensors 16-26 and the set of measurement data is passed through conduits 28–38, and recorded in microprocessor 40. The intensities sensed by sensors 16, 18, and 20 will be the greatest since the gamma-rays impinging upon those sensors were transmitted only through the hydrocarbon layer which is the least dense component present. The intensity sensed by sensor 26 will be the least since the gamma-rays impinging upon that sensor were required to travel through the greatest amount of hydrofluoric acid layer which is the most dense component present. The intensity sensed by sensor 24 will be greater than that of sensor 26 because the amount of path length that passed through the hydrofluoric acid layer of the gamma-ray impinging upon sensor 24 was less than that of the gamma-ray impinging upon sensor 26. The intensity sensed by sensor 22 will be between that of sensor 20 and sensor 24 because the gamma-rays impinging on sensor 24 were required to pass through the hydrocarbon layer and the emulsion layer, but not through the hydrofluoric acid layer.

After the set of intensities for source 10 has been recorded in microprocessor 40, source 10 is deactivated and source 12 is activated. FIG. 2 shows the gamma-rays radiating outward from source 12 and permeating through the vessel and its contents. Again the intensity of the gamma-rays exiting the vessel is measured by the six sensors 16–26, the set of measurement data is passed through conduits 28–38, and recorded in microprocessor 40. The relative intensities sensed by the six sensors 16–26 will be as described above. However, the intensity sensed by a single sensor when source 10 was active as compared to when source 12 is active provides greater detail as to the levels of the layers of components. For example, compare the path of gamma-rays from source 10 to sensor 24 to the path of gamma-rays from source 12 to sensor 24. In the first case less than one-half of the path length is through the more dense emulsion, while in the second case, almost three-fourths of the path length is through the more dense emulsion. Therefore, the intensity sensed in the first case will be the result of a shorter emulsion and acid path than that sensed in the second case.

Similarly, after the set of intensities for source 12 has been recorded in microprocessor 40, source 12 is deactivated and source 14 is activated. FIG. 3 shows the gamma-rays radiating outward from source 14 and permeating through the vessel and its contents. Again the intensity of the gamma-rays exiting the vessel is measured by the six sensors 16–26, the set of measurement data is passed through conduits 28–38, and recorded in microprocessor 40. Source 14 is then deactivated. The aggregate of the intensity measurements is analyzed in microprocessor 40 using a multiple linear regression algorithm which relates the intensities sensed to the average density of the components penetrated over the path length of the gamma-ray. The results of the analysis provide an accurate indication of the level of the hydrocarbon layer, the hydrofluoric acid layer and the emulsion layer.

The process may be continued by reactivating one of the sources, such as source 10, as shown in FIG. 1. Again the gamma-rays radiate outward from source 10 and permeate through the vessel and its contents and impinge upon the array of sensors. The intensity of the gamma-rays exiting the vessel is again measured by the six sensors 16–26, the set of measurement data is passed through conduits 28–38, and recorded in microprocessor 40. At this point, the aggregate of measurements consisting of the new set of intensity measurements corresponding to source 10 and the previous sets of intensity measurements corresponding to sources 12 and 14 may be analyzed in microprocessor 40 using the algorithm to determine the current levels of fluid in the vessel. Alternatively, each energy source may be sequentially activated and each corresponding set of intensity measurements recorded in microprocessor 40, and the aggregate of the new sets of measurements taken over a full cycle analyzed in microprocessor 40 using the algorithm to determine current levels of the fluids in the vessel.

It must be emphasized that the above description is merely illustrative of a preferred embodiment and is not intended as an undue limitation on the generally broad scope of the invention. Moreover, while the description is narrow in scope, one skilled in the art will understand how to extrapolate to the broader scope of the invention. For example, the procedure for using a greater number of energy sources or sensors, and using energy sources, sensors, and algorithms of different types can be readily extrapolated from the foregoing description. Similarly, one skilled in the art would understand how the different types of energy sources and sensors could be utilized.

What is claimed is:

1. A process for determining the levels and interface in a vessel of two or more immiscible or partially-miscible liquids comprising:

a) transmitting energy selected from the group consisting of gamma rays and x-rays through the vessel by sequentially activating at least three stationary energy sources positioned adjacent to and in the vertical plane of the vessel;

b) sensing a set of intensities of the energy exiting the vessel corresponding to each energy source using an array of stationary sensors where each set comprises the intensity sensed by each sensor in the array of sensors, said sensors of the array positioned in the vertical plane of the vessel and in alignment with the energy penetrating the vessel, said array containing a number of sensors that is at least one greater than the number of energy sources; and c) recording the sets of intensities sensed by the array and applying an algorithm selected from the group consisting of partial least squares with latent variables, multiple linear regression, principal component regression, and neural networks to the aggregate of recordings to determine the levels and interface of the liquids and any emulsion of the liquids.

2. The process of claim 1 wherein the sequence of steps (a), (b), and (c) are repeated at least once.

3. The process of claim 1 further comprising reactivating at least one of the energy sources, sensing and recording a new set of intensities of the energy exiting the vessel corresponding to the reactivated energy source, applying the algorithm to the aggregate of the new set of intensities and the previously recorded sets of intensities corresponding to those energy sources not reactivated to determine the levels and interface of the liquids and any emulsion of the liquids.

4. The process of claim 1 wherein the energy is gamma rays.

5. The process of claim 1 wherein the two liquids are hydrocarbon and hydrofluoric acid.

6. The process of claim 1 wherein the two liquids are hydrocarbon and hydrofluoric acid and an emulsion of the two liquids is present.

7. The process of claim 1 wherein the sensors are further positioned adjacent to the vessel.

8. The process of claim 1 wherein the sensors are clustered into groups and the groups are positioned at intervals along the vertical plane of the vessel.

9. An apparatus for determining the levels in a vessel of two or more at least partially immiscible liquids having different densities and any emulsion of the liquids, said apparatus comprising:

a) at least three stationary energy sources positioned adjacent to and in the vertical plane of the vessel;

b) means for controlling the transmittance of energy from the source to the vessel;

c) an array of stationary sensors positioned in the vertical plane of the vessel and in alignment with energy transmitted through the vessel, said array containing a number of sensors that is at least one greater than the number of radiation sources; and d) a means of recording and analyzing the intensities using an algorithm selected from the group consisting of partial least squares with latent variables, multiple linear regression, principal component regression, and neural networks to determine the levels and interface of the liquids.

10. The apparatus of claim 9 wherein the energy sources are capable of providing energy selected from the group consisting of gamma rays and x-rays.

11. The apparatus of claim 9 wherein the energy source provides gamma rays.

12. The apparatus of claim 9 wherein the sensors are further positioned adjacent to the vessel.

13. The apparatus of claim 9 wherein the sensors are clustered into groups and the groups are positioned at intervals along the vertical plane of the vessel.

* * * * *